US012716568B2

(12) United States Patent
Vosloh

(10) Patent No.: US 12,716,568 B2
(45) Date of Patent: Aug. 25, 2026

(54) VEHICLE LIGHT AND VEHICLE

(71) Applicant: Hella GmbH & Co. KGaA, Lippstadt (DE)

(72) Inventor: Vincent Vosloh, Anröchte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 19/310,227

(22) Filed: Aug. 26, 2025

(65) Prior Publication Data

US 2026/0063270 A1 Mar. 5, 2026

(30) Foreign Application Priority Data

Aug. 28, 2024 (DE) ........................ 102024124496.8

(51) Int. Cl.

*F21S 45/50* (2018.01)
*F21S 41/20* (2018.01)
*F21S 41/29* (2018.01)
*F21S 43/20* (2018.01)
*F21S 43/27* (2018.01)

(52) U.S. Cl.

CPC ........... *F21S 45/50* (2018.01); *F21S 41/2805* (2024.05); *F21S 41/29* (2018.01); *F21S 43/265* (2024.05); *F21S 43/27* (2018.01)

(58) Field of Classification Search

CPC .......... F21S 45/50; F21S 43/27; F21S 43/265; F21S 41/29; F21S 41/2805

See application file for complete search history.

(56) References Cited

U.S. PATENT DOCUMENTS

| | | | | |
|---|---|---|---|---|
| 2016/0320012 | A1* | 11/2016 | Takada | F21S 41/295 |
| 2020/0011499 | A1* | 1/2020 | Hess | F21S 41/29 |
| 2023/0313966 | A1* | 10/2023 | Messenger | G02B 7/003 362/521 |
| 2024/0034239 | A1* | 2/2024 | Lettis | B60R 1/06 |
| 2024/0117957 | A1* | 4/2024 | Huang | F21V 17/164 |
| 2025/0243998 | A1* | 7/2025 | Li | F21V 17/101 |
| 2025/0297718 | A1* | 9/2025 | Drüppel | F21S 41/29 |
| 2025/0362002 | A1* | 11/2025 | Tamura | F21S 43/26231 |
| 2026/0008406 | A1* | 1/2026 | Friesen | B60Q 1/0466 |

FOREIGN PATENT DOCUMENTS

| | | | |
|---|---|---|---|
| DE | 29905780 | U1 | 8/2000 |
| DE | 102018106180 | A1 | 9/2019 |
| EP | 1270319 | A2 | 1/2003 |

* cited by examiner

*Primary Examiner* — Christopher E Dunay
(74) *Attorney, Agent, or Firm* — Husch Blackwell LLP

(57) ABSTRACT

A vehicle light is provided with a housing which partially delimits an interior and has an open side. A light source assembly is positioned inside the housing. An at least partially transparent outer lens is positioned on the open side of the housing. The outer lens is attached to the housing with a snap-fit assembly and a seal assembly to obtain a fluid-tight seal. The seal assembly contains a seal placed in a circumferential groove on the housing. The snap-fit assembly has a snap-fit component on the outer lens, which engages in the groove and is snapped onto the housing inside the groove. When fully assembled, the snap-fit component bears on the seal and the outer lens is releasably attached to the housing.

11 Claims, 2 Drawing Sheets

VEHICLE LIGHT AND VEHICLE

CROSS REFERENCE

This application claims priority to German Application No. 102024124496.8, filed Aug. 28, 2024, the entirety of which is hereby incorporated by reference.

FIELD OF THE INVENTION

The invention relates to vehicle light with a housing, which has an open side and partially delimits an interior, a light source assembly inside the housing, and an at least partially transparent outer lens on the open side of the housing, in which the outer lens is attached to the housing with a snap-fit assembly and a seal assembly to obtain a fluid-tight seal, wherein the seal assembly contains a seal placed in a circumferential groove on the housing, and the snap-fit assembly has a snap-fit component on the outer lens, which engages in the groove and is snapped into the housing in the groove.

BACKGROUND OF THE INVENTION

EP 1 270 319 A2 discloses a vehicle light that has a frame to which a light source and outer lens are attached. The outer lens is attached to the frame with a snap-fit assembly formed by lugs on the outer lens and holes in the frame, and adhesive. The lugs engage in the holes such that the outer lens is snapped onto the frame. The outer lens is also glued to the frame to obtain a fluid-tight seal. The adhesive is placed in a circumferential groove on the frame and the lugs also engage therein, snapping the lens in sections therein onto the frame. When assembling the light, these sections on the outer lens are inserted into the groove to snap it in place. Adhesive is then placed in the groove to obtain the final connection between the lens and the frame. Consequently, the lens is initially snapped onto the frame and then permanently glued thereto. It is also possible to simply glue the outer lens to the frame or a housing.

The outer lens may become damaged. It could be damaged by gravel, objects or vandalism. It could also become worn, yellowed, or scratched over time such that the light are less bright or it could blind oncoming traffic. To rectify this, the entire light is normally replaced, because the lens is permanently attached to the housing or frame. This is relatively expensive. In EP 1 270 319 A2, the outer lens is normally glued to the frame, requiring removal of the adhesive to remove the lens, which may make it difficult to install a new lens such that it is sealed to the frame if residual adhesive remains in the groove and is difficult to remove.

BRIEF SUMMARY OF THE INVENTION

The object of the invention is to create light for a vehicle that can be easily and inexpensively repaired.

The snap-fit assembly and seal assembly used in the invention are designed such that the lens can be released from the housing where it is attached to the seal. This outer lens is only attached to the housing by the snap-fit assembly, and the seal assembly provides the seal therebetween.

If the outer lens becomes damaged, e.g. by gravel, objects or vandalism, or worn, it can be replaced without having to replace the other components of the light. This simply requires releasing the snap-fit connection between the lens and the housing and removing the lens. A new lens is then snapped in place on the housing. This ideally does not require removing the entire light from the vehicle.

This makes it possible to easily and inexpensively replace a damaged or worn lens. This significantly reduces repair costs and the associated difficulty if only the lens is damaged.

The housing preferably has lugs that extend into the groove that can be snapped in place behind the projection in the groove. When assembling the light, the lens is pressed against the housing such that its outer snap-fit component bears against the seal in the groove. When the snap-fit component is inserted into the groove, the lugs press against the projection at a right angle. Once the lens is pressed in far enough, the lugs snap in place behind the projection. It would also be possible to form the lugs on the lens and the projection on the housing.

The side walls of the housing are thinner where the lugs are in a preferred design. These side walls are preferably thin enough that they give when snapping the lens in place. The walls are preferably thin enough that they can bulge outward where the lugs are to obtain the snap-fit connection. This does not require any slits that need be subsequently sealed. By making the walls thinner, they are more flexible where the lugs are, thus requiring less strength to replace the lens on the housing.

In a preferred design, the projection bears on the seal such that it is compressed, which in turn presses the lugs against the projection. The seal is fully expanded prior to attaching the lens. When attaching the lens, the seal is compressed by the snap-fit component, such that in the assembled state, i.e. when the lugs are snapped in place, the seal is compressed, holding the lens in place. This presses the projection against the lugs, holding the lens in place and compensating for any production or assembly tolerances. This also results in a seal being formed between the snap-fit component of the lens and seal, and between the seal and the housing, reliably sealing off the interior of the housing. The seal is made of an elastic material, in particular silicone or EPDM foam rubber.

The snap-fit component on the lens or housing preferably has a stop. This prevents insertion of the snap-fit component too far into the groove and pushing the lens too far onto the housing, thus avoiding damage to the lens or the seal during assembly.

In a preferred design, the lens has a hole for a tool. This hole allows for a standard screwdriver to be inserted into the groove to release the lugs from the projection and remove the lens.

The outer lens preferably has a cover section, the surface of which is flush with the housing. This cover section forms the edge of the lens and is parallel to the snap-fit component. The cover section is circumferential and is flush with the edge of the housing. This cover section conceals the groove.

The housing comprises numerous parts in a preferred design, in which the groove is delimited by two separate housing elements. The housing is made of plastic, each element of which forms an integral part. Making the house out of numerous parts simplifies production of the lugs and eliminates the need for complicated sliders. A first element forms the base of the housing, which is shaped like a cup. A second element forms a liner inside the first element. This second element forms a blind behind which the light source assembly, i.e. a printed circuit board populated with light sources and other components, is located, and the light sources extend through apertures in the blind, such that only these light sources and the second housing element can be seen through the transparent outer lens.

The outer lens is preferably snapped onto the housing at numerous points that are spaced apart over its circumference. The lugs are distributed over the circumference of the housing. A circumferential projection can be formed on the snap-fit component. Alternatively, there can be numerous projections on the snap-fit component, corresponding to the lugs on the housing. The use of numerous lugs distributes the load evenly where the lens is attached to the housing.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
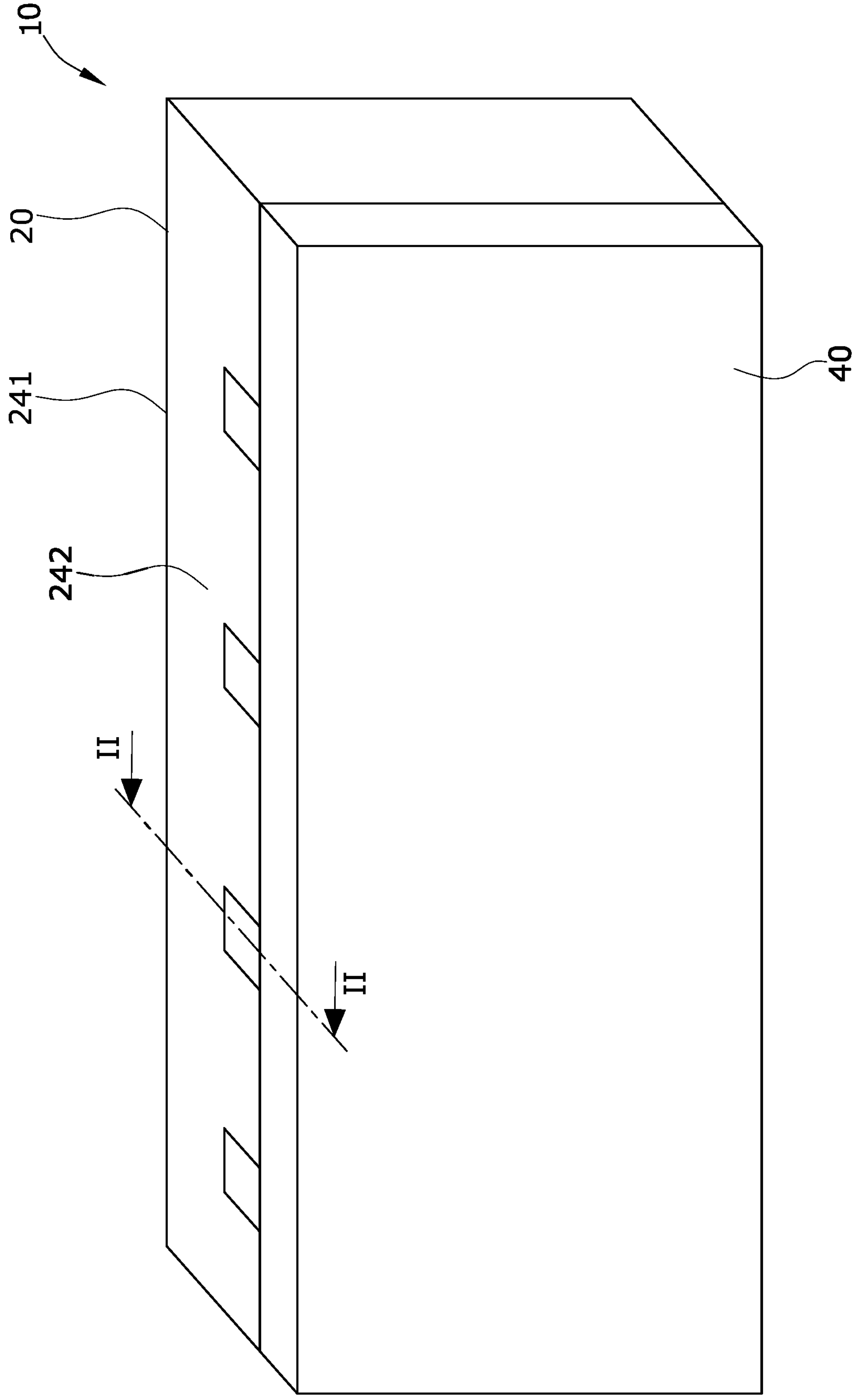
FIG. 1 shows a schematic and perspective illustration of a vehicle light.
Figure 2:
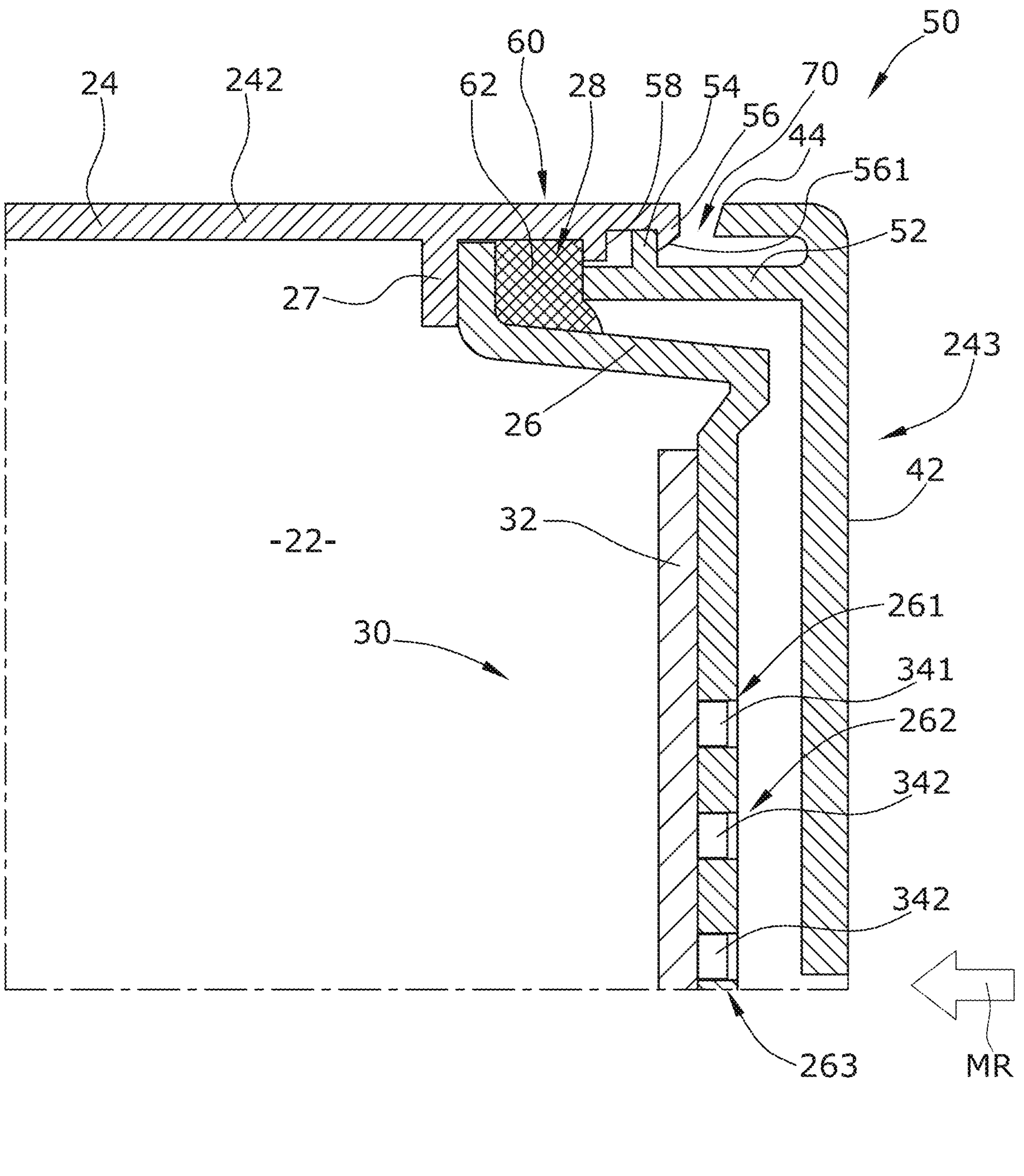
FIG. 2 shows a cross section of the light in FIG. 1.

FIG. 1 shows a light 10 that can have a variety of designs and be placed at different locations on a vehicle. This light 10 can have a variety of purposes, e.g. as taillight at the rear of the vehicle, or a daytime running light or headlight at the front. FIG. 2 shows part of a sectional view of the light 10.

The light 10 has a housing 20, a light source assembly 30, and an outer lens 40, wherein the housing 20 and the lens 40 delimit the housing interior 22.

The housing 20 is composed of two elements 24, 26, both of which are made of a single piece of plastic. The housing elements 24, 26 are produced in particular in an injection molding process.

The first element 24 is shaped like a cup or shell with a base 241 and circumferential side walls 242, with an open side 243 opposite the base 241. This element 24 therefore forms an outer part or basic structure for the light 10 with which the light 10 can be attached to other components.

The second element 26 is inside the first element 24 and bears on a projection 27 of the first element 24. The second element 26 therefore forms a liner. The second element 26 is substantially flat and has a light-projecting surface corresponding to the light-projecting surface formed by the open side 243 encompassed by the first element 24.

The light source assembly 30 is between the two housing elements 24, 26, and therefore in the interior 22. The light source assembly 30 contains a printed circuit board 32 populated with numerous light sources 341, 342, 343, which are on the side of the printed circuit board 32 facing toward the second housing element. The second housing element 26 has apertures 261, 262, 263 for each of the light sources 341, 342, 343. The second housing element 26 therefore forms a blind that conceals the area behind it, through which only the light sources 341, 342, 343 can be seen.

The outer lens 40 is transparent and on a side of the second housing element 26 facing away from the printed circuit board 32. The outer lens 40 is made of a single piece of plastic. It could also be composed of numerous pieces. The edge of the outer lens 40 is releasably attached to the housing 20 with a snap-fit assembly 50 and a seal assembly 60. The housing 20 has a circumferential groove 28 for a seal 62 that is delimited by the two housing elements 24, 26. The seal 62 is made of an elastic material, e.g. an elastomer or EPDM foam rubber. The snap-fit assembly 50 has a snap-fit component 52 on the outer lens 40 that is at a right angle to the light-emitting surface 42, which engages in the groove 28 with a projection 54. The projection 54 is parallel to the light-emitting surface 42 on the outer lens 40. The snap-fit assembly 50 also has lugs 56 on the housing 20, i.e. on the first housing element 24, which extend into the groove 28 and engage behind the projection 54 on the snap-fit component 52 when the light 10 is fully assembled. The first housing element 24 also has a stop 58 that also extends into the groove 28 and is downstream of the lugs 56 in the assembly direction MR.

To prevent being able to see into the groove 28, the outer lens 40 has a cover section 44 outside and substantially parallel to the snap-fit component 52. The cover section 44 is flush with the edge of the housing 20 in the assembled state of the light 10.

When assembling the light 10, the housing elements 24, 26 and the light source assembly 30 are first put together. The outer lens 40 is then placed thereon. The seal 62 is first placed in the groove 28 for this, after which the snap-fit component 52 of the lens 40 is inserted in the assembly direction MR into the groove. At this point, the projection 54 comes in contact with the lugs 56, pressing it outward, at a right angle to the assembly direction MR. In order to translate the force exerted on the lens 40 into the force acting on the lugs 56 at a right angle to the assembly direction MR, the lugs 56 are have an angled surface 561. Once the lens 40, and therefore the projection 54, have been fully inserted, the lugs 56 return to their starting position, snapping in place, where they engage behind the projection 54. This also results in circumferential contact between the snap-fit component 52 and the seal 62 in the groove 28, such that the seal 62 is compressed between the housing 20 and the lens 40, and pressed against the lugs 56 by the projection 54.

To release the snap-fit connection, e.g. to replace the lens 40 when it becomes damaged, a tool, in particular a standard screwdriver, can be inserted into the groove 28 to release the lugs 56. To simplify this, the lens 40 can have beveled holes 70 for the tool on its edge.

LIST OF REFERENCE SYMBOLS

10 Vehicle light
20 housing
22 interior of the housing
24 first housing element
241 base
242 side walls
243 open side
26 second housing element
261 aperture
262 aperture
263 aperture
27 projection
28 groove
30 light source assembly
32 printed circuit board
341 light source
342 light source
343 light source
40 outer lens
42 light-emitting surface
44 cover section
50 snap-fit assembly
52 snap-fit component
54 projection
56 lug
561 angled section of the lug
58 stop
60 seal assembly

62 seal
70 tool hole
MR assembly direction

The invention claimed is:

1. A vehicle light comprising:

a housing which partially delimits an interior, the housing having an open side;

a light source assembly inside the housing; and an at least partially transparent outer lens on the open side of the housing, wherein the outer lens is attached to the housing with a snap-fit assembly and a seal assembly to obtain a fluid-tight seal, wherein the seal assembly contains a seal placed in a circumferential groove on the housing, wherein the outer lens has a light-emitting surface, a snap-fit component extending from the light-emitting surface, and a cover section positioned outside and substantially parallel to the snap-fit component, wherein the snap-fit component engages in the groove and is snapped into the housing in the groove, wherein when fully assembled, the snap-fit component bears on the seal and the outer lens is releasably attached to the housing, wherein the housing has a snap-fit lug in the groove configured to snap in place behind a projection of the snap-fit component in an assembled state, and wherein a hole is defined between the cover section and the snap-fit lug, the hole configured to receive a tool to facilitate releasing the snap-fit component from the snap-fit lug.

2. The vehicle light according to claim 1, wherein the snap-fit lug extends from a side wall of the housing, wherein the side wall is thinner in a first region proximate the snap-fit lug than a second region farther from the snap-fit lug to enable the side wall to flex in the first region proximate the snap-fit lug.

3. The vehicle light according to claim 1, wherein the snap-fit component bears on the seal such that the seal is compressed, and the projection is configured to move the snap-fit lug in a direction counter to an assembly direction (MR).

4. The vehicle light according to claim 1, wherein the snap-fit component or housing has a stop.

5. The vehicle light according to claim 1, wherein a surface of the cover section is flush with the housing.

6. The vehicle light according to claim 1, wherein the housing is composed of numerous parts, wherein the groove is delimited by two separate housing elements.

7. The vehicle light according to claim 1, wherein the seal is made of an elastic material.

8. The vehicle light according to claim 7, wherein the elastic material is silicone or EPDM foam rubber.

9. The vehicle light according to claim 1, wherein the outer lens is snapped onto the housing at numerous spaced-apart points.

10. A vehicle comprising the vehicle light according to claim 1.

11. The vehicle light according to claim 1, wherein:

the snap-fit lug is positioned at an end of a side wall of the housing defining the open side, the side wall has a flexible portion proximate the snap-fit lug to enable the snap-fit lug to move outward via a force exerted on the snap-fit lug by the projection of the snap-fit component, and the snap-fit lug has an angled surface configured to translate engagement between the projection and the snap-fit lug in an assembly direction (MR) to outward movement of the snap-fit lug.

* * * * *